(12) United States Patent
Garrett et al.

(10) Patent No.: US 8,359,297 B2
(45) Date of Patent: Jan. 22, 2013

(54) MULTIPLE SOURCE DATA MANAGEMENT USING A CONFLICT RULE

(75) Inventors: Andrew J. Garrett, Herts (GB); James A. Martin, Jr., Endicott, NY (US); Jeffrey E. Prince, Bloomfield Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 11/427,528

(22) Filed: Jun. 29, 2006

(65) Prior Publication Data

US 2008/0027965 A1 Jan. 31, 2008

(51) Int. Cl.
*G06F 17/30* (2006.01)
(52) U.S. Cl. ............................ 707/702; 345/664; 726/24
(58) Field of Classification Search .................. 707/101, 707/802; 345/744, 664; 726/24
See application file for complete search history.

(56) References Cited

U.S. PATENT DOCUMENTS

| 5,806,074 | A | 9/1998 | Souder et al. |
| 6,295,541 | B1 | 9/2001 | Bodnar et al. |
| 6,810,405 | B1 | 10/2004 | LaRue et al. |
| 2003/0137536 | A1* | 7/2003 | Hugh ............................ 345/744 |
| 2005/0223117 | A1 | 10/2005 | Terry et al. |
| 2006/0106879 | A1 | 5/2006 | Zondervan et al. |
| 2006/0106881 | A1 | 5/2006 | Leung et al. |

* cited by examiner

*Primary Examiner* — Shahid Alam
(74) *Attorney, Agent, or Firm* — William E. Schiesser; Hoffman Warnick LLC

(57) ABSTRACT

A solution for managing data received from multiple sources is provided. In particular, when conflicting data values are received from multiple sources for a data element, a conflict rule is used to determine the main data value for the data element, which is subsequently stored for use. The conflict rule can define any automatic, semi-automatic, or manual procedure for resolving the conflict. The conflict rule, or an identifier thereof, can be stored with each data value and the main data value for the data element.

8 Claims, 3 Drawing Sheets

MULTIPLE SOURCE DATA MANAGEMENT USING A CONFLICT RULE

FIELD OF THE INVENTION

The invention relates generally to managing data that is received from multiple sources, and more particularly, to a solution for resolving conflicts between data values for a data element that are received from multiple sources.

BACKGROUND OF THE INVENTION

Frequently, multiple parties are asked to provide data on an object (used to generically refer to any physical or conceptual thing or group of things). The data is then compiled and stored in a single location. Often, two or more of the parties will provide data on one or more of the same data elements when providing data on the object. In this case, the data values may not all be the same. Consequently, there is a risk that one source could overwrite data supplied by another, which could result in correct data being overwritten with incorrect data.

In view of the foregoing, a need exists to overcome one or more of the deficiencies in the related art.

BRIEF SUMMARY OF THE INVENTION

The invention provides a solution for managing data received from multiple sources. In particular, when conflicting data values are received from multiple sources for a data element, a conflict rule is used to determine the main data value for the data element, which is subsequently stored for use. The conflict rule can define any automatic, semi-automatic, or manual procedure for resolving the conflict. The conflict rule, or an identifier thereof, can be stored with each data value and the main data value for the data element. In this manner, a permanent record of the derivation of the main data value can be obtained and/or the conflict rule can be modified and a new main data value can be obtained. The invention enables a user to configure any number of conflict rules that can be designated for use on data elements for which data values are or may be received from multiple sources. As a result, the process of integrating the data received from the multiple sources can be made more effective by increasing a likelihood that the correct data value will be used.

A first aspect of the invention provides a method of managing data received from a plurality of sources, the method comprising: obtaining a data value received from each of the plurality of sources for a data element; determining whether a conflict exists between the obtained data values; using a conflict rule to determine a main data value for the data element when the conflict exists; and storing the main data value for the data element.

A second aspect of the invention provides a system for managing data received from a plurality of sources, the system comprising: a system for obtaining a data value received from each of the plurality of sources for a data element; a system for determining whether a conflict exists between the obtained data values; a system for using a conflict rule to determine a main data value for the data element when the conflict exists; and a system for storing the main data value for the data element.

A third aspect of the invention provides a computer program comprising program code stored on a computer-readable medium, which when executed, enables a computer system to implement a process for managing data received from a plurality of sources, the process comprising: obtaining a data value received from each of the plurality of sources for a data element; determining whether a conflict exists between the obtained data values; using a conflict rule to determine a main data value for the data element when the conflict exists; and storing the main data value for the data element.

A fourth aspect of the present invention provides computer software embodied in a propagated signal for managing data received from a plurality of sources, the computer software comprising instructions for causing a computer system to perform the following: obtain a data value received from each of the plurality of sources for a data element; determine whether a conflict exists between the obtained data values; use a conflict rule to determine a main data value for the data element when the conflict exists; and store the main data value for the data element.

A fifth aspect of the invention provides a method of generating a system for managing data received from a plurality of sources, the method comprising: providing a computer system operable to: obtain a data value received from each of the plurality of sources for a data element; determine whether a conflict exists between the obtained data values; use a conflict rule to determine a main data value for the data element when the conflict exists; and store the main data value for the data element.

A sixth aspect of the invention provides a business method for managing data received from a plurality of sources, the business method comprising managing a computer system that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing data received from multiple sources. In particular, when conflicting data values are received from multiple sources for a data element, a conflict rule is used to determine the main data value for the data element, which is subsequently stored for use. The conflict rule can define any automatic, semi-automatic, or manual procedure for resolving the conflict. The conflict rule, or an identifier thereof, can be stored with each data value and the main data value for the data element. In this manner, a permanent record of the derivation of the main data value can be obtained and/or the conflict rule can be modified and a new main data value can be obtained. The invention enables a user to configure any number of conflict rules that can be designated for use on data elements for which data values are or may be received from multiple sources. As a result, the process of integrating the data received from the multiple sources can be made more effective by increasing a likelihood that the correct data value will be used. As used herein, unless otherwise noted, the term "set" means one or more (i.e., at least one) and the phrase "any solution" means any now known or later developed solution.

Figure 1:
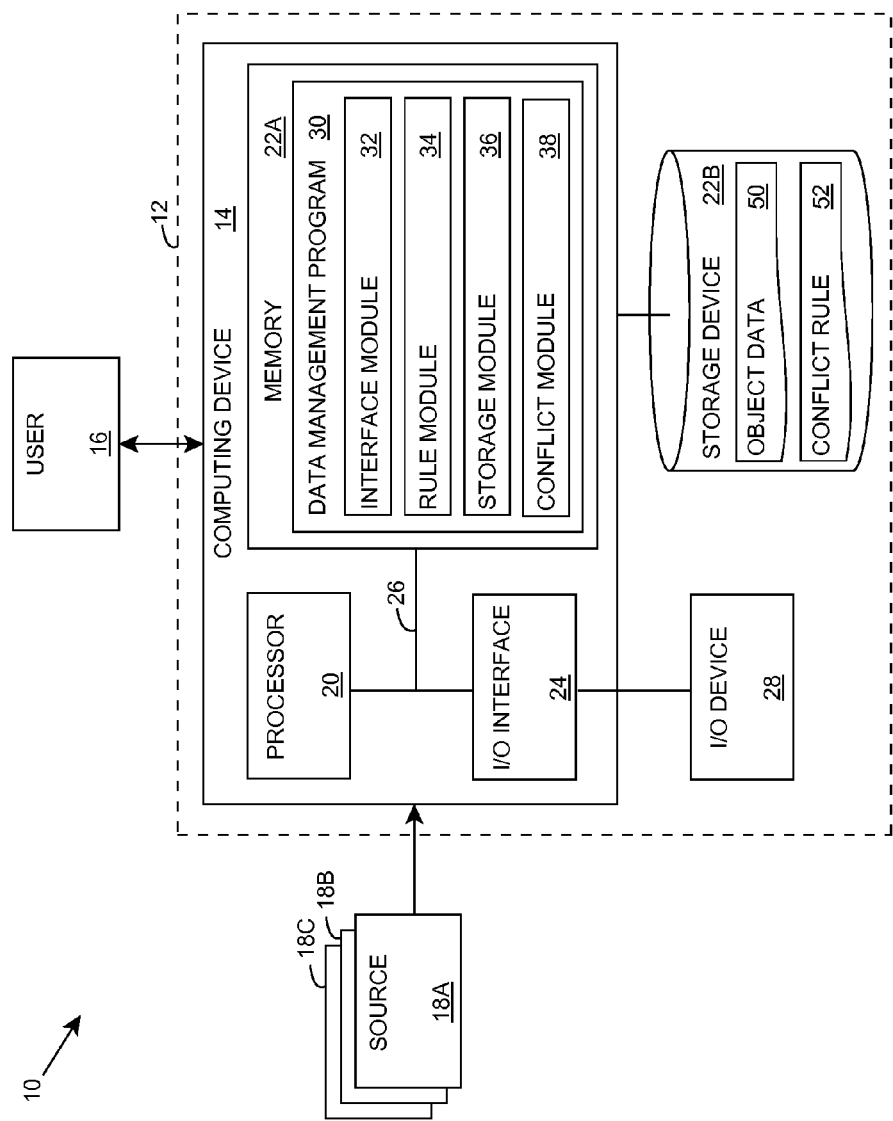
FIG. 1 shows an illustrative environment for managing data received from a plurality of sources according to an embodiment of the invention.

Turning to the drawings, FIG. 1 shows an illustrative environment 10 for managing data, such as object data 50, received from a plurality of sources 18A-C according to an embodiment of the invention. To this extent, environment 10 includes a computer system 12 that can perform the process described herein in order to manage object data 50. In particular, computer system 12 is shown including a computing device 14 that comprises a data management program 30, which makes computing device 14 operable to manage object data 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as data management program 30, which is stored in a storage system, such as memory 22A and/or storage device 22B. While executing program code, processor 20 can read and/or write data, such as object data 50, to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user 16 to communicate with computing device 14 using any type of communications link.

In any event, computing device 14 can comprise any general purpose computing article of manufacture capable of executing program code installed thereon. However, it is understood that computing device 14 and data management program 30 are only representative of various possible equivalent computing devices that may perform the process described herein. To this extent, in other embodiments, the functionality provided by computing device 14 and data management program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, data management program 30 enables computer system 12 to manage data received from a plurality of sources 18A-C. To this extent, data management program 30 is shown including an interface module 32, a rule module 34, a storage module 36, and a conflict module 38. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Figure 2:
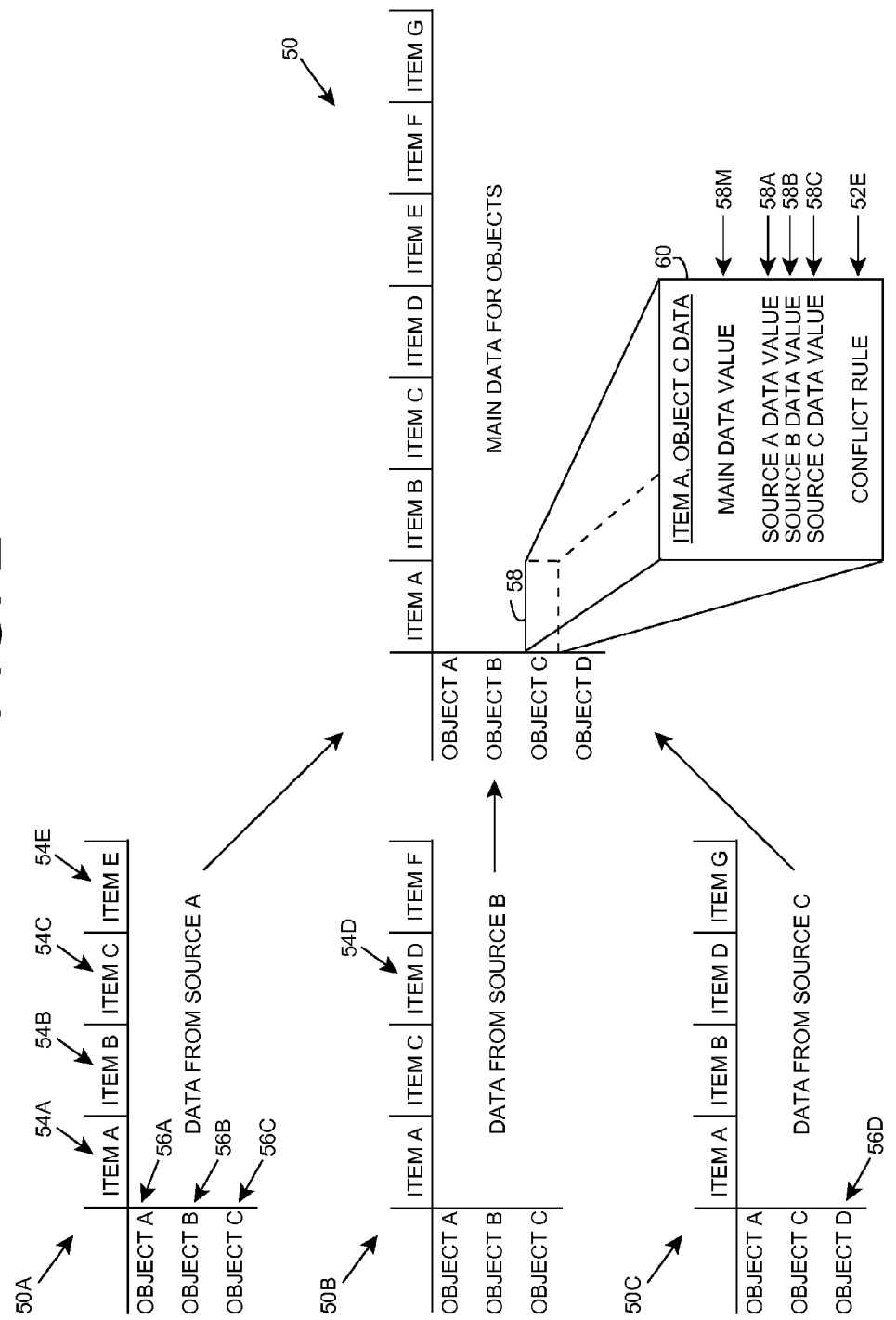
FIG. 2 shows an illustrative data flow diagram according to an embodiment of the invention.

Regardless, the invention provides a solution for managing data received from a plurality of sources 18A-C. To this extent, FIG. 2 shows an illustrative data flow diagram according to an embodiment of the invention. Referring to FIGS. 1 and 2, interface module 32 can receive data, such as object data 50A-C, from a plurality of sources 18A-C using any solution. For example, interface module 32 can generate a user interface for presentation to one or more sources 18A-C, which enables sources 18A-C to define object data 50A-C. To this extent, the user interface can enable a source 18A-C to specify (e.g., add, modify, delete) the data values for object data 50A-C using the interface, identify a data store (e.g., one or more files, database, and/or the like) that includes some or all of the object data 50A-C, and/or the like. Further, interface module 32 can define an application program interface (API) or the like that enables source 18A-C, another computer system in this case, to define object data 50A-C.

In any event, the object data 50A-C received from each source 18A-C can include data for a plurality of items, such as items 54A-E, which data management program 30 can combine to generate object data 50. Further, object data 50A-C can include data for a plurality of objects, such as objects 56A-D. In this manner, object data 50A-C can comprise a two-dimensional set of data and can be received and/or stored in a spreadsheet, multiple records in a database table, and/or the like. It is understood, however, that object data 50A-C can comprise any number of dimensions (e.g., one or more). Regardless of the number of dimensions, each unique combination for which a data value is received is referred to as a data element, such as data element 58.

In general, each set of object data 50A-C will include one or more data elements that are unique from the other set(s) of object data 50A-C. For example, data elements for item 54E are only included in object data 50A. Similarly, data elements for object 56D are only included in object data 50C. However, one or more data elements may be included in two or more sets of object data 50A-C. For example, a data element 58 for item 54 and object 56C is included in all three sets of object data 50A-C. In this case, it is possible that a data value for data element 58 will be included in two or more of the sets of object data 50A-C, which may result in a conflict between the data values.

Figure 3:
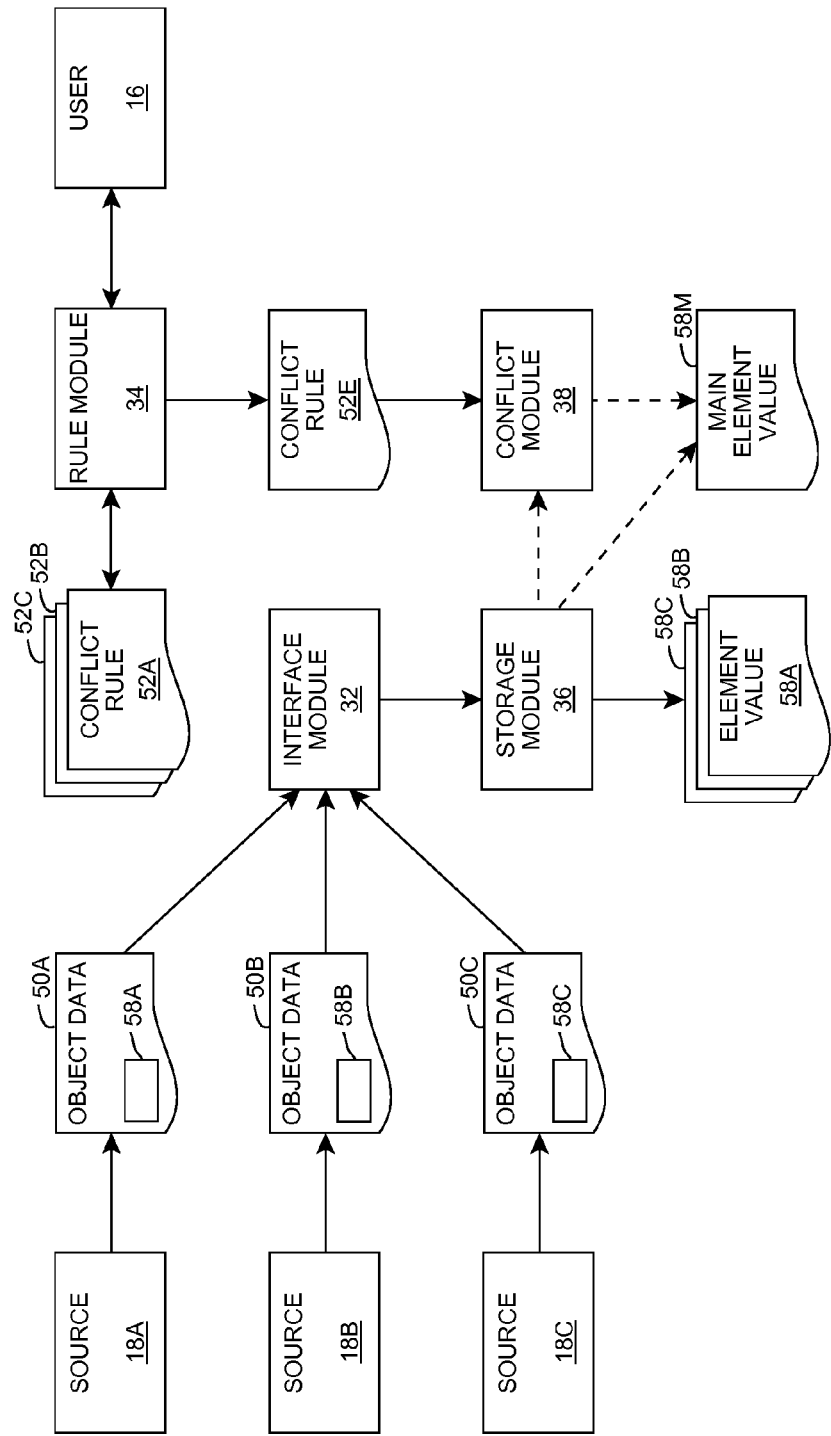
FIG. 3 shows an illustrative data flow diagram for the various modules in the data management program of FIG. 1 according to an embodiment of the invention.

In order to resolve such a conflict, data management program 30 uses a conflict rule 52. FIG. 3 shows an illustrative data flow diagram for the various modules in data management program 30 (FIG. 1) according to an embodiment of the invention. Rule module 34 can manage a set of conflict rules 52A-C. Each conflict rule 52A-C can define a decision process and/or a set of actions to be performed to determine a main data value (e.g., main element value 58M) when a conflict exists between the data values (e.g., element values 58A-C) received from two or more sources 18A-C. Conflict rules 52A-C can define numerous types of processes, actions, and/or the like, for resolving the conflict, some of which are described herein.

Regardless, rule module 34 can enable a user 16 to define a conflict rule 52A-C for a data element 58 (FIG. 2) using any solution (e.g., user interface, API, and/or the like). To this extent, rule module 34 can enable user 16 to create, modify, delete, etc., conflict rules 52A-C using any solution. Further, rule module 34 can enable user 16 to designate a conflict rule 52A-C for a data element 58. Referring briefly to FIG. 2, user 16 can designate a conflict rule 52A-C for a single data element 58, for a group of data elements, such as all data elements for data item 54A or all data items for object 56A, for all object data 50, and/or the like. In this manner, user 16 can configure conflict rules 52A-C for one or more data elements 58 using any solution.

Returning to FIG. 3, after interface module 32 receives object data 50A-C from sources 18A-C, storage module 36 can parse object data 50A-C for storage in a single location (e.g., as object data 50 of FIG. 2). Storage module 36 can use any solution for identifying a data element 58 (FIG. 2) that corresponds with a data value 58A-C. In one embodiment, object data 50A-C each comprises a predefined spreadsheet that is provided for use by sources 18A-C and in which the data values are entered. In this case, storage module 36 can obtain a list of columns/rows that correspond to one another to identify the correct data element 58. Similarly, object data 50A-C could comprise data values together with one or more field names, which can be readily used to identify a correct data element 58 using any solution.

In any event, storage module 36 can determine a main data value for each element (e.g., main element value 58M) based on the set of element values 58A-C received from sources 18A-C. When none of object data 50A-C includes an element value 58A-C, storage module 36 can store a default value as main element value 58M. For example, storage module 36 can store a NULL value, an invalid value, and/or the like. Further, storage module 36 can use the default value to alert a user 16 and/or one or more sources 18A-C (e.g., by sending a message, highlighting the field, and/or the like) that no element value 58A-C was received for the element 58.

When object data 50A-C includes a single element value, such as element value 58A, for a data element 58 (FIG. 2), storage module 36 can store the element value 58A as the corresponding main element value 58M. Similarly, when object data 50A-C includes multiple element values 58A-C for a data element 58 that are all the same, storage module 36 can use any one of the element values 58A-C as the main element value 58M. However, when object data 50A-C includes two or more different element values 58A-C for a data element 58, then a conflict exists and conflict module 38 can resolve the conflict using a conflict rule 52E. It is understood that storage module 36 can determine when a conflict exists as discussed herein, or conflict module 38 can determine when a conflict exists by always analyzing two or more element values 58A-C that are received for a data element 58.

Regardless, when a conflict exists between two or more element values 58A-C for a data element 58 (FIG. 2), conflict module 38 can obtain a conflict rule 52E from rule module 34. In one embodiment, shown in FIG. 2, data element 58 includes a group 60 of data that is stored for data element 58. Group 60 includes main data (element) value 58M, each data (element) value 58A-C that was received, and conflict rule 52E. It is understood that an identifier/reference for conflict rule 52E can be stored, which can be used by rule module 34 to provide the applicable conflict rule 52E for use by conflict module 38 in determining main data value 58M. Group 60 can be stored using any solution, e.g., as fields in a database record, multiple database records, in a data file, and/or the like.

Returning to FIG. 3, conflict module 38 uses conflict rule 52E for element 58 (FIG. 2) to determine main element value 58M. Conflict rule 52E can define any of numerous types of partially/fully automated processes and/or actions to perform in order to determine main element value 58M. To this extent, conflict rule 52E can define and automatically apply a priority assigned to each source 18A-C. In this case, conflict rule 52E can automatically select an element value 58A-C received from the source 18A-C having the highest priority. For example, conflict rule 52E can define a highest priority for source 18A, a second highest priority to source 18B, and a third highest priority to source 18C. In this case, when a conflict between element values 58A-C is present, conflict rule 52E can specify to use element value 58A (received from source 18A) when one is received, use element value 58B (received from source 18B) when one is received and no value is received from source 18A, and use element value 58C otherwise. In this manner, data received from a more trusted source can be used over data received from a less trusted source.

Similarly, main element value 58M can be determined using a partially automated solution. To this extent, conflict rule 52E can select one of the element values 58A-C based on priorities corresponding to each of the sources 18A-C as discussed herein, and then present the selected element value, e.g., element value 58A, for evaluation by user 16 and/or one or more sources 18A-C, and can obtain main element value 58M based on the evaluation. For example, the element value 58A can be provided to each source 18B-C that provided a different element value 58B-C. In response, each source 18B-C can agree to change the element value 58B-C to the selected element value 58A or can provide an indication that the selected element value 58A is incorrect. In the latter case, conflict module 38 can enable user 16 and/or sources 18A-C to collaborate and determine the appropriate main element value 58M. Similarly, conflict module 38 can provide all unique element values 58A-C for evaluation by one or more sources 18A-C and/or user 16, which in turn can provide one of the element values 58A-C or another element value to conflict module 38 for use as the main element value 58M. In this case, conflict module 38 can provide the unique element values 58A-C with an indication of the corresponding source(s) 18A-C of each element value 58A-C and/or priority for the source(s) 18A-C.

It is understood that conflict rules 52E discussed herein are only illustrative. To this extent, any number of variations can be implemented. For example, when three or more sources 18A-C provide element values 58A-C, a conflict rule 52E could specify to use the element values 58A-C received from a majority of the sources 18A-C. To this extent, each source 18A-C could be assigned a corresponding weight, which is used to determine the majority. Additionally, it is understood that any automated, semi-automated, or manual solution could be implemented. For example, conflict module 38 could merely indicate that a conflict exists (e.g., by assigning a default value for main element value 58M), and user 16 can evaluate the element values 58A-C and provide a main element value 58M. Similarly, conflict module 38 can provide feedback (e.g., send a message, generate a log, and/or the like) when main element value 58M is automatically obtained using a conflict rule 52E.

Still further, it is understood that various settings/options, such as a priority for each source 18A-C, feedback, and/or the like, can be selected by user 16 (using rule module 34) for an individual data element 58 (FIG. 2), a related group of data elements, all object data, and/or the like. Additionally, while shown and described with three sources 18A-C, it is understood that any number of sources 18A-C (zero or more) may provide an element value 58A-C for a particular data element 58. To this extent, storage module 36 and/or conflict module 38 can process object data 50A-C dynamically after each set of object data 50A-C is received or can wait until all object data 50A-C has been received before processing object data 50A-C. In the former case, a conflict may not be detected until a later received object data 50A-C is processed and a main element value 58M may be modified as a result of a later received object data 50A-C being processed. While not discussed in detail herein for clarity, it is understood that data management program 30 can implement various functionality for storing, reading, modifying, displaying, etc., object data 50 (FIG. 1) using any solution. To this extent, when presenting object data 50 for evaluation by a user 16, data management program 30 can include an indicator on those data elements 58 for which a conflict was present and resolved.

In an illustrative application, each source 18A-C comprises an entity (e.g., an employee, a subcontractor, a customer) that is a stakeholder for a particular project (e.g., will perform work, is the customer, is an investor, and/or the like). In this case, each source 18A-C can provide data on the project (e.g., a physical location, a set of requirements, and/or the like), which is compiled into a master set of data on the project for use by a project coordinator (e.g., a contractor). In this case, element values 58A-C for one or more data elements 58 (FIG. 2) for the project may be received from multiple sources 18A-C. For example, each source 18A-C can provide a set of data for multiple physical locations at which work on the project will occur. To this extent, each source 18A-C can include a physical location (e.g., a street address) for the corresponding set of data. When compiling the data into a master set of data, conflict module 38 can use one of a set of conflict rules 52 to determine which element value 58A-C to use when there is a conflict. For example, for a street address, conflict module 38 can use the data provided by the customer, which owns the land/building at the street address (and is therefore most likely to have provided the correct data value).

While shown and described herein as a method and system for managing data received from a plurality of sources, it is understood that the invention further provides various alternative embodiments. For example, in one embodiment, the invention provides a computer program stored on a computer-readable medium, which when executed, enables a computer system to manage data received from a plurality of sources. To this extent, the computer-readable medium includes program code, such as data management program 30 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing data received from a plurality of sources. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider, such as an solutions integrator, could offer to manage data received from a plurality of sources as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing data received from a plurality of sources, the method comprising:

obtaining a multi-dimensional set of data from each of the plurality of sources, each multi-dimensional set of data including a common data element; and generating a main multi-dimensional set of data based on a combination of the sets of data, the generating including:

obtaining a data value for the data element from each of the sets of data obtained from the plurality of sources;

determining whether a conflict exists between the obtained data values;

using a conflict rule to determine a main data value for the data element in the main multi-dimensional set of data when the conflict exists;

storing a derivation record for the main data value for the data element in the main multi-dimensional set of data, the derivation record including: the main data value, the data value received from each of the plurality of sources, and the conflict rule;

obtaining the stored derivation record;

modifying the conflict rule, which is stored in the derivation record; and
determining a new main data value using the modified conflict rule.

2. The method of claim 1, further comprising obtaining one of a plurality of conflict rules for use as the conflict rule for the data element.

3. The method of claim 1, further comprising:
receiving a second data value for a second data element from one of the plurality of sources; and
storing the second data value as a main data value for the second data element.

4. The method of claim 1, further comprising using the data value as the main data value when the conflict does not exist.

5. The method of claim 1, wherein the using includes automatically selecting the data value received from one of the plurality of sources based on a corresponding priority for each of the plurality of sources.

6. The method of claim 1, wherein the using includes:
selecting the data value received from one of the plurality of sources based on a corresponding priority for each of the plurality of sources;
presenting the selected data value for evaluation by at least one of the sources; and
obtaining the main data value based on the evaluation.

7. The method of claim 1, wherein the using includes:
providing the plurality of data values for evaluation by a third party; and
obtaining the main data value based on the evaluation.

8. The method of claim 1, wherein each of the sets of data obtained from the plurality of sources are stored in a spreadsheet.

* * * * *